(12) United States Patent
Leiseboer et al.

(10) Patent No.: US 11,341,251 B2
(45) Date of Patent: May 24, 2022

(54) ENCRYPTION ENABLING STORAGE SYSTEMS

(71) Applicant: Quintessencelabs Pty Ltd., Deakin (AU)

(72) Inventors: John Leiseboer, Deakin (AU); Vikram Sharma, Deakin (AU); Ken Li Chong, Deakin (AU)

(73) Assignee: Quintessencelabs Pty Ltd., Deakin (AU)

(*) Notice: Subject to any disclaimer, the term of this patent is extended or adjusted under 35 U.S.C. 154(b) by 474 days.

(21) Appl. No.: 15/956,688

(22) Filed: Apr. 18, 2018

(65) Prior Publication Data

US 2018/0307848 A1    Oct. 25, 2018

Related U.S. Application Data

(60) Provisional application No. 62/487,094, filed on Apr. 19, 2017, provisional application No. 62/487,240, (Continued)

(51) Int. Cl.
*G06F 21/60* (2013.01)
*H04L 9/06* (2006.01)
(Continued)

(52) U.S. Cl.
CPC ........ *G06F 21/602* (2013.01); *G06F 12/0891* (2013.01); *G06F 21/78* (2013.01); (Continued)

(58) Field of Classification Search
CPC ........... G06F 21/602; G06F 2221/2143; G06F 12/0891; G06F 21/78; G06F 2212/1052; H04L 9/0656; H04L 9/0894; H04L 9/0869
See application file for complete search history.

(56) References Cited

U.S. PATENT DOCUMENTS 6,363,152 B1 *   3/2002   Cornelius .............. H04L 9/0656
                                                380/255
6,606,707 B1 *   8/2003   Hirota ..................... G06F 21/78
                                                713/172
(Continued)

FOREIGN PATENT DOCUMENTS

EP      3612971 A2    2/2020
WO   2007/109373 A2   9/2007
WO   2017/022002 A1   2/2017

OTHER PUBLICATIONS

Rakesh Shukla • Hari Om Prakash • R. Phani Bhushan • S. Venkataraman • Geeta Varadan; Sampurna Suraksha: Unconditionally Secure and Authenticated One Time Pad Cryptosystem; 2013 International Conference on Machine Intelligence and Research Advancement (pp. 174-178); (Year: 2013).*

(Continued)

*Primary Examiner* — James R Turchen
*Assistant Examiner* — Chao Wang
(74) *Attorney, Agent, or Firm* — Kilpatrick Townsend & Stockton LLP

(57) ABSTRACT

A system includes a data storage device containing encrypted data to be decrypted, and a VZ storage device containing a key material for decrypting data, wherein the VZ storage device decrypts the encrypted data by consuming a portion of the key material and stores the decrypted data in the consumed portion of the key material.

19 Claims, 13 Drawing Sheets

Related U.S. Application Data filed on Apr. 19, 2017, provisional application No. 62/487,106, filed on Apr. 19, 2017.

(51) Int. Cl.
   *H04L 9/08* (2006.01)
   *G06F 21/78* (2013.01)
   *G06F 12/0891* (2016.01)

(52) U.S. Cl.
   CPC .......... *H04L 9/0656* (2013.01); *H04L 9/0869* (2013.01); *H04L 9/0894* (2013.01); *G06F 2212/1052* (2013.01); *G06F 2221/2143* (2013.01)

(56) References Cited

U.S. PATENT DOCUMENTS

| | | | |
|---|---|---|---|
| 2003/0149869 | A1 | 8/2003 | Gleichauf |
| 2006/0177065 | A1* | 8/2006 | Halbert ................ H04L 9/0662 380/277 |
| 2013/0138961 | A1 | 5/2013 | Tsuji et al. |
| 2014/0122867 | A1* | 5/2014 | Shrinivasan ........ H04L 63/0428 713/155 |
| 2014/0281576 | A1 | 9/2014 | Suzuki |
| 2014/0337640 | A1* | 11/2014 | Sharma ................ H04L 9/0894 713/193 |
| 2015/0229621 | A1* | 8/2015 | Kariman ............. H04L 63/0478 713/168 |
| 2015/0244520 | A1* | 8/2015 | Kariman ............... H04L 9/0656 713/168 |
| 2015/0293857 | A1* | 10/2015 | Cope ..................... G06F 21/602 713/193 |
| 2015/0295907 | A1 | 10/2015 | Abrahamson |
| 2018/0322024 | A1* | 11/2018 | Nagao ................. G06F 11/1662 |

OTHER PUBLICATIONS

Vaibhav Rekhate • Ankush Tale • Nikhil Sambhus • Amit Joshi; Secure and efficient message passing in distributed systems using One-Time Pad; 2016 International Conference on Computing, Analytics and Security Trends (CAST) (pp. 393-397); (Year: 2016).*

M. Jenkin • P. Dymond; Secure communication between lightweight computing devices over the Internet; Proceedings of the 35th Annual Hawaii International Conference on System Sciences (p. 5 pp.); (Year: 2002).*

PCT/AU2018/000056, "International Search Report and Written Opinion", dated Nov. 30, 2018, 16 pages.

Extended European Search Report for Application No. 18788552.0-1218 / 3612971 PCT/AU2018000056, dated Jan. 20, 2021, 7 pages.

Examination Report for Australian Patent Application No. 2018255501, dated Jan. 31, 2022, 3 pages.

* cited by examiner

ENCRYPTION ENABLING STORAGE SYSTEMS

CROSS-REFERENCES TO RELATED APPLICATIONS

This application claims priority to U.S. Provisional Patent Application No. 62/487,094 filed on Apr. 19, 2017, entitled "Limited Read-Back Virtual Zeroisation System And Method," U.S. Provisional Patent Application No. 62/487,106 filed on Apr. 19, 2017, entitled "Limited Read-Back Virtual Zeroisation Memory," and U.S. Provisional Patent Application No. 62/487,240 filed on Apr. 19, 2017, entitled "One-Time Key Recovery System And Method," the disclosures of which are hereby incorporated by reference in their entirety for all purposes.

BACKGROUND OF THE INVENTION

Communication and data security are central to the management of any mission critical operations. Mission critical operations may include a myriad of operations, such as corporate security, national security and international missions. Specifically, securely encrypting and decrypting large amounts of data in the field are either insecure or are challenging and expensive.

For example, when a mobile platform (aircraft) collects sensitive information on a mission in an adversary territory, the collected information needs to be persistently stored in memory, but does not need to be read back in plain text form when isolated from a key management system that stores the original key material. There are numerous opportunities for the collected information to be compromised when an adversary gets hold of the memory device that contains the collected information. For example, the aircraft may get shot down or captured by an adversary. The adversary not only can retrieve the information stored in the memory, but also can generate the original encryption key that is used to protect the collected information.

Therefore, there is a need to provide a secure system to not only secure collected data but also the key that is used to protect the collected data.

BRIEF SUMMARY OF THE INVENTION

Embodiments of the present invention provide devices, systems, and methods for protecting confidential data and securely transferring one-time pad key materials.

In one embodiment, a system includes a data storage device containing encrypted data to be decrypted, and a Virtual Zeroisation (VZ) storage device. The VZ storage device contains key material that can be used for decrypting data stored on the data storage device. The encrypted data stored on the data storage device is encrypted prior to being stored on the data storage device using the same key material that is stored on the VZ storage device. In one configuration, the VZ storage device is coupled to the data storage device and receives encrypted data from the data storage device. The VZ storage device decrypts the encrypted data by using a portion of the key material, securely erases the used portion of key material, and writes the decrypted data to an available location in the VZ storage device. In one implementation, example key material may include a one-time pad. In certain embodiments, the data is encrypted by XOR'ing the key material with the data and then storing the encrypted data in the data storage device. At a later point in time (e.g., in the field), the data storage device is coupled to the VZ storage device and the encrypted data (i.e., data XOR'ed with key material) is again XOR'ed with the key material stored on the VZ storage device to obtain decrypted data (plaintext).

In another embodiment, a system may include a Virtual Zeroisation (VZ) storage device containing key material, a random number generator configured to generate a sequence of random numbers to encrypt the key material to obtain an encrypted key material, and an XOR circuit configured to perform an XOR operation between the sequence of random numbers and the encrypted key material to recover the key material that is originally contained in the VZ storage device prior to being encrypted by the random number generator. In one embodiment, the random number generator may be a true random number generator.

In yet another embodiment, a system may include a cache device for temporarily storing data to be encrypted, a security storage device coupled to the cache device for encrypting data received from the cache device, and a cache controller for controlling data flow between the cache device and the security storage device. The security device includes an encryption unit for encrypting the data received from the cache device using a key material, and a storage unit coupled to the encryption unit and containing the key material, wherein the security device encrypts the data of the cache device by using a portion of the key material and stores the encrypted data in the used portion of the key material.

Embodiments of the present invention also provide methods for securely transmitting key material and decrypting cipher texts using key material. In one embodiment, a method for securely transmitting key material may include providing a Virtual Zeroisation (VZ) storage device that contains the key material, generating a sequence of random numbers by a random number generator, encrypting the key material to obtain an encrypted key material that is stored in the VZ storage device, decrypting the encrypted key material using the sequence of random numbers to recover the key material, and temporarily storing the recovered key material in a cache device. In one embodiment, the cache device is a volatile memory device. In one embodiment, the method further includes erasing the key material stored in the cache device in response to an event. In some embodiments, the event may be a user triggered event, or environmental changes that are detected by sensors.

In one embodiment, a method is provided for securely storing decrypted data that has been decrypted using key material stored in a VZ storage device. The method may include providing a VZ storage device having a storage device containing key material, providing a nonvolatile device that stores encrypted data to be decrypted, decrypting the encrypted data using the key material, and overwriting the key material with the decrypted data. The method may further include temporarily storing the decrypted data in a cache device, and erasing the decrypted data stored in the VZ storage device. The method may also include erasing the decrypted data stored in the cache device in response to an event. In some embodiments, the event may be a user triggered event, or environmental changes that are detected by sensors.

The following description, together with the accompanying drawings, will provide a better understanding of the nature and advantages of the claimed invention.

BRIEF DESCRIPTION OF THE DRAWINGS

Embodiments of the present invention are described with reference to the accompanying drawings. In the drawings, like reference numbers may indicate identical or functionally similar elements.

DETAILED DESCRIPTION OF THE INVENTION

Figure 1:
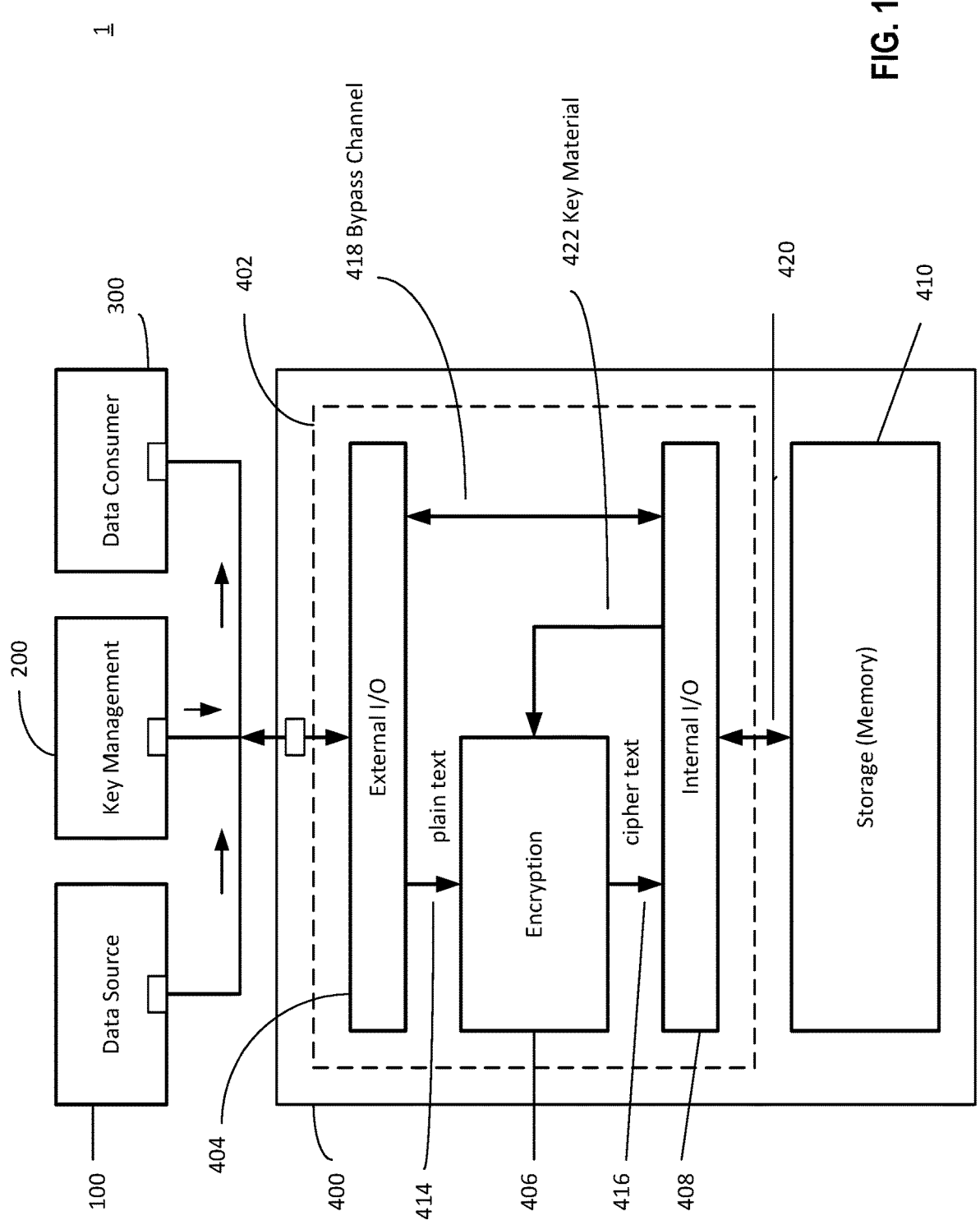
FIG. 1 is a block diagram of a virtual zeroisation system including a virtual zeroisation storage device.

FIG. 1 illustrates a virtual zeroisation system 1 in accordance with an embodiment of the present disclosure. Referring to FIG. 1, the system 1 includes a data source 100, a key management system 200, a data consumer 300, and a virtual zeroisation storage device 400. In some embodiments, the data source 100 may include a sensor, camera, or other data collecting device mounted on a mobile platform (e.g., an aircraft). As the mobile platform performs its mission, it collects data and stores the collected data into virtual zeroisation storage device 400 in an encrypted form. The virtual zeroisation device 400, as shown, is connected to each of the data source 100, data consumer 300, and a key management system 200. Each of the data source 100, data consumer 300, key management system 200, and virtual zeroisation device storage 400 communicates with each other through well-known appropriate interfaces and buffers. These are illustrated in the drawing as small rectangles where the connectors to each block are depicted.

The key management system 200 provides an encryption key material, to both the data consumer 300 and the virtual zeroisation storage device 400. While this key material can be provided in different formats, e.g. as a "public key" which uses a pair of keys, one to encrypt and one to decrypt, in the present disclosure we use a "one-time pad" key material.

A one-time pad is a type of encryption which is impossible to defeat if used correctly. One-time pads are known to be "information-theoretically secure" in that the encrypted message, that is the cipher text, provides essentially no information about the original message to a cryptanalyst. Properly created and used one-time pads are secure even against adversaries with infinite computational power.

In a one-time pad each bit or character from the plain text is encrypted by a modular addition, e.g., an exclusive OR (XOR), with a bit or character from the secret random key (one-time pad) of the same length as the plaintext, thereby providing cipher text. Claude Shannon proved, using information theory considerations, that the one-time pad has a property of "perfect secrecy," that is, the cipher text gives absolutely no additional information about the plain text.

The key management system 200 can be any type of device which provides encryption keys for use in encrypting data from the data source as will be described further below. In one embodiment, however, the key management system provides keys, in the form of a one-time pad, which are used to encrypt and decrypt the data from the data source 100. This one-time pad key information can be provided using various techniques; however, in the embodiment we employ quantum technology to generate truly random key material. One suitable approach for accomplishing this is to use the techniques described in our co-pending commonly assigned patent application serial number PCT/AU2012/000390, filed Apr. 16, 2012, and entitled "QKD Key Management System." The contents of this application are incorporated by reference herein in their entirety.

Referring to FIG. 1, the virtual zeroisation storage device 400 can be understood as including a virtual zeroisation control function (unit) 402 and a storage device 410. The storage device 410 can include any type of memory or storage device, e.g. a hard disk drive, a flash memory, etc. The virtual zeroisation control function 402 includes an external input/output interface 404, an encryption function (unit) 406, and internal input/output interface 408. As used herein, a function or a unit may include logic (hardware and/or software) for performing the specific functions.

The virtual zeroisation device 400 is initially configured by being loaded with the one-time pad key from the key management system 200. The key management system 200 has a key management system interface (illustrated as a small rectangle) through which the encryption key material, i.e. one-time pad, is transmitted to both the virtual zeroisation device 400 through the virtual zeroisation storage device interface and to the data consumer 300 via the data consumer interface. The external input/output function (unit) 404 passes one-time pad key material from the key management system 200 to the internal input/output function (unit) 408 via the bypass channel 418. In the virtual zeroisation device 400, the one-time pad key is stored in the storage device 410.

When the virtual zeroisation device 400 is placed in operation, the data source 100 (e.g. a camera on the mobile platform) transmits its "plain text" data through the data source interface to the virtual zeroisation storage device 400 via the virtual zeroisation storage device interface. The virtual zeroisation storage device 400 receives the plain text data from the data source 100, and passes it over a plain text channel 414 to the encryption unit 406. The internal input/output interface 408 passes one-time pad key material read from the storage device 410 via the storage channel 420 to the encryption function (unit) 406 via the key input channel 422. Using the one-time pad key material, the encryption unit encrypts the plain text data and stores it in storage device 410 as a cipher text through a cipher text channel 416. In some embodiments, the virtual zeroisation storage device 400 may read a block of key material into internal temporary storage (e.g. a register) in the encryption unit (406), securely erase the key material from the storage device, encrypt the incoming block of data with the temporary copy of the key material, erase the temporary copy of the key material, and write the encrypted data (cipher text) to the storage device (410). In one embodiment, the encrypted data (cipher text) may be written to the same location in the storage device as the key material was read. In another embodiment, the encrypted data (cipher text) may be written to a different location in the storage device as the key material was read. Viewing from outside the VZ storage device 400, it would appear as the cipher text is stored in the storage device 410, it writes over the portion of the one-time pad key that has been consumed for encryption, thereby erasing it from the storage device 410. In any case, the virtual zeroisation control function 402 causes key material read from the storage device 410 to be permanently erased from the storage device 410, thereby assuring that the key material can only be read once from the storage device 410, and is not recoverable from the virtual zeroisation storage device 400 after being read.

Upon return from the mission, or otherwise recovery of the virtual zeroisation device 400, data from the virtual zeroisation device 400 is provided to the data consumer 300. The internal input/output function (unit) 408 passes cipher text read from the storage device 410 via the storage channel 420 to the external input/output function 404 via the bypass channel 418. From there it is provided to the data consumer 300 where it is decrypted using the one-time pad key material previously provided to the data consumer 300.

Among the advantages of the invention are that, in the implementation, data saved on the storage device 410 is encrypted using an information theoretic cipher—the one-time pad—and that the key material used for the encryption cannot be recovered from the device. Further, because used key material is not recoverable, and because all stored data is information—theoretically encrypted, manually initiated zeroisation is not required. In addition, any unused key material remaining in the virtual zeroisation device 400 after use provides no value to an adversary—that key material never having been used. Thus, even if the device has been compromised, anti-tamper functionality is not required.

The invention also overcomes other disadvantages of prior art approaches. In many applications, practical problems prevent the use of one-time pads. To be maximally effective, the one-time pad requires perfect randomness. While the system described here can be implemented with key material having less than perfect randomness, the quantum key management system described in our co-pending patent application referenced above generates completely random keys.

A second issue regarding one-time pads is the need to use, and therefore, distribute the same key material to the encryption system (here the virtual zeroisation device) and to the decryption system (here the data consumer). This requires secure communication of the key material between the two systems, and assurance that after use, the key material stored in the encryption system does not become available to the adversary. Our system overcomes this disadvantage by denying an adversary access to the key material on the virtual zeroisation device by erasing the one time-pad from the virtual zeroisation device 400 as the key material is used.

Figure 2:
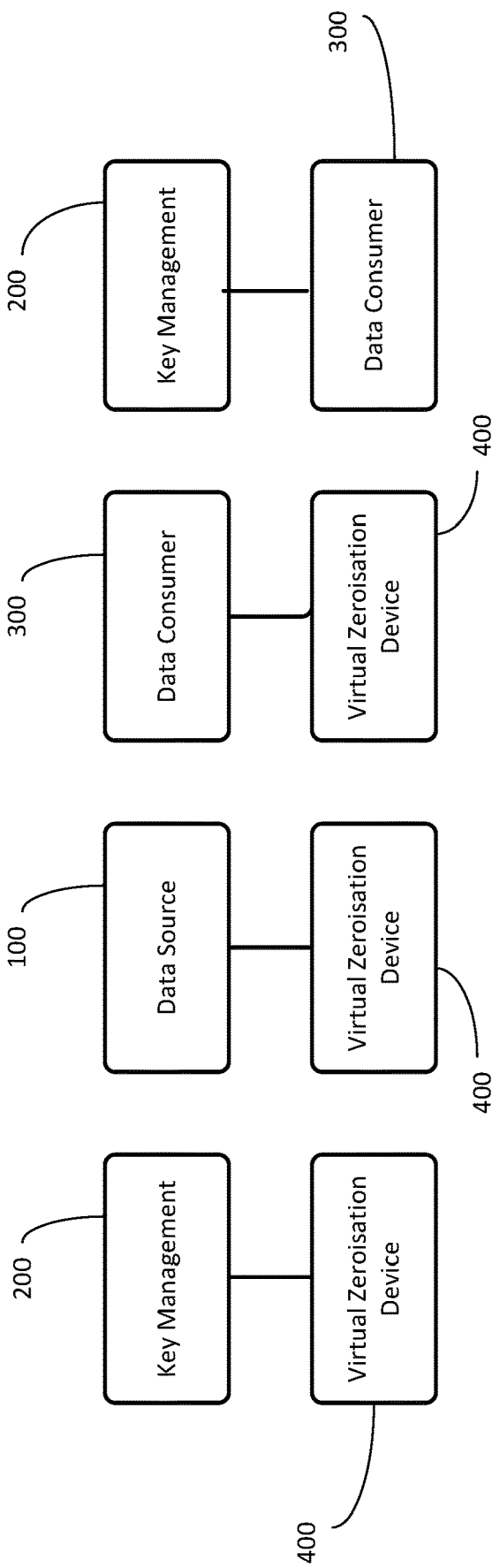
FIGS. 2A to 2D illustrate operations of the virtual zeroisation storage device shown in FIG. 1.

FIGS. 2A to 2D illustrate the method of operation of the virtual zeroisation device 400 for storage and recovery of collected data. In FIG. 2A, the virtual zeroisation storage device 400 is loaded with one-time key material from the key management system 200.

FIG. 2B illustrates that data collected by the data source 100 is written to the virtual zeroisation storage device 400. As the data is saved to the virtual zeroisation storage device 400, it is encrypted with the one-time pad key material. As it is used for encryption, the key material used is erased from the virtual zeroisation storage device 400.

Referring to FIG. 2C, the data consumer 300 reads the collected data, as cipher text, from the virtual zeroisation storage device 400.

Referring to FIG. 2D, the data consumer 300 uses the key material from the key management system 200, enabling the data consumer 300 to decrypt the cipher text and access the originally collected data.

As described above, the virtual zeroisation storage device 410 is first filled with one-time pad key material using the control unit 402 within the virtual zeroisation device 400. As the mobile platform performs its mission, data is collected on the mission, and is written to the storage device 410. As this data is received, it is encrypted using the one-time pad material. Upon return of the mission the collected and encrypted data in the storage device 410 is decrypted by the data consumer 300 enabling appropriate analysis, e.g., by a data processing system.

If the mobile asset, i.e., the storage device 410, is compromised during the mission, for example by coming under the control of an adversary, the adversary can try to read the collected data in its cipher text form. The data, however, is useless without the key material. Because the cipher text is protected by the information-theoretically secure one-time pad cipher, and because the key material used for the encryption cannot be recovered from the storage device, the collected data remains secure. The remaining unused key material which the adversary reads from the virtual zeroisation storage device 410 has not been used for any encryption, and therefore that material is of no value to the adversary.

Among the advantages of the virtual zeroisation storage device over conventional storage devices, whether or not they used fixed length classical encryption, are that data saved on the storage device is encrypted using an information theoretic cipher—the one time pad, and that the key material used for the encryption operation cannot itself be recovered from the device. A third advantage is that because the used key material is not recoverable and because all data is stored in an encrypted form, manually initiated zeroisation of the device is not necessary. Furthermore, because any unused key material remaining on the device is of no value to an adversary, it is not necessary to equip the device with anti-tamper functionality.

Figure 3:
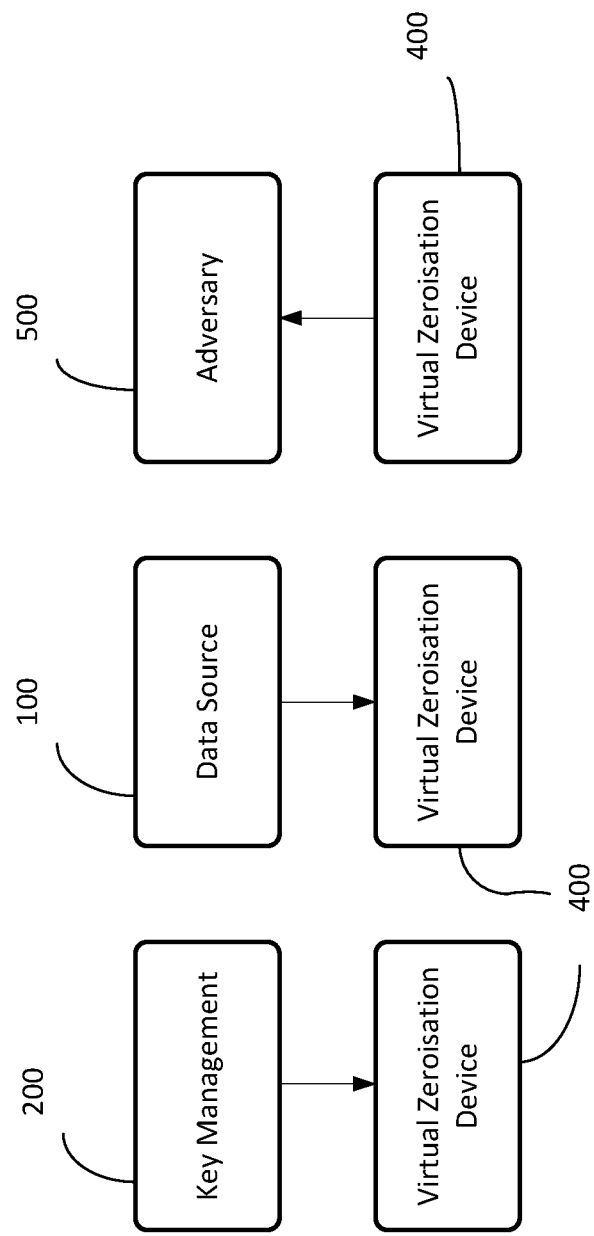
FIGS. 3A to 3C illustrate an example of how the virtual zeroisation storage device protects its stored data even if the device is in possession of an adversary.

FIGS. 3A to 3C illustrate the method by which protection of the data on the storage device 410 is protected from an adversary. Referring to FIG. 3A, the virtual zeroisation storage device 400 is loaded with one-time key material from the key management system 200.

Referring to FIG. 3B, data collected by the data source 100 is written to the virtual zeroisation device 400. As plain text data is saved to the storage device within the virtual zeroisation device, it is encrypted with the one-time pad cipher. The portion of the key material used for encryption is erased from the storage device 410 as the cipher text data is stored in its place.

FIG. 3C assumes an adversary 500 has control of the virtual zeroisation device 400, and reads the collected data (as cipher text), and the unconsumed portion (remaining unused portion) of the key material from the virtual zeroisation storage device 410. Because the cipher text is protected by the information-theoretic secure one-time pad cipher, and because the key material used for the encryption cannot be recovered from the virtual zeroisation storage device 400, the collected data remains secure. The remaining unused key material read from the virtual zeroisation storage device 400 has not been used for encryption, and therefore provides no value to the adversary 500.

Figure 4:
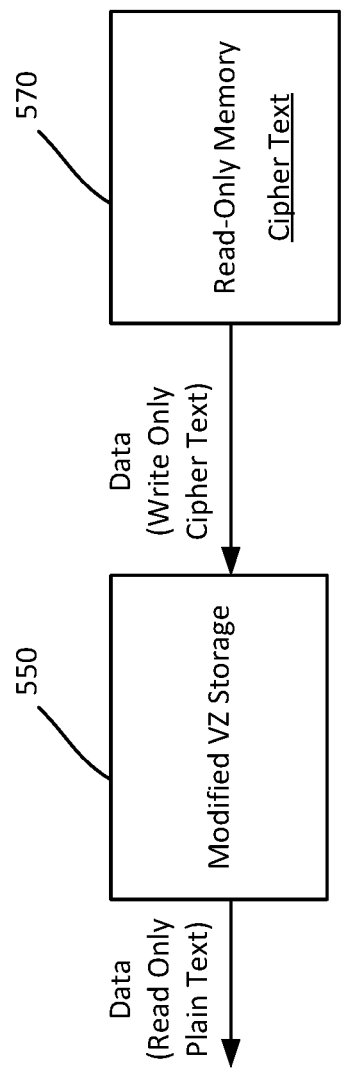
FIG. 4 is a block diagram illustrating a virtual zeroisation (VZ) system for decrypting a cipher text using a VZ storage device that can only be used once according to an embodiment of the present invention.

FIG. 4 is a block diagram illustrating a virtual zeroisation (VZ) system 4 for decrypting a cipher text using a VZ storage device that can only be used once according to one embodiment of the present invention. Referring to FIG. 4, the VZ system 4 may include a modified VZ storage device 550 and a read-only memory device 570 containing a cipher text. The read-only memory 570 can be any type of memory device that supports read operations. For example, the read-only memory device 570 may be a static read-only-memory (ROM) device, electronically erasable and programmable read only memory (EEPROM), electronically programmable read only memory (EPROM), flash memory, compact disc read only memory (CDROM), digital versatile disc (DVD), flash memory, magnetic storage devices (cassette, tape), or a battery backed static random access memory (SRAM) device that can store a cipher text or encrypted information data. The modified VZ storage device 550 is initialized with a one-time key material (alternatively referred to as "one-time pad"). The read-only memory device 570 has data encrypted with the same one-time key material (one-time pad) that was loaded into the modified VZ storage device 550. During operation, in order to read the data in plain text, it is first read (as cipher text) from the read-only memory device 570. This data is then written to the modified VZ storage device 550. The modified VZ storage device 550 "encrypts" the data using the one-time key material stored within it, as is done with a VZ storage device. For the one-time pad algorithm, this second "encryption" with the same key material results in decryption of the original data, thus revealing the plain text of the stored information. Referring to FIG. 1, the plain text is now stored in the storage device 410 together with the remaining portion of the one-time pad key that has not been consumed by the decrypted cipher text.

Modification to virtual zeroisation (VZ) is desirable because the stored information in the VZ storage device is now in plain text. The modification is an additional secure erasure after the data has been decrypted and read. So at the end of the operation, the VZ storage device has both the remaining key material and the plain text data in the consumed portion of the key material, hence the name "modified VZ storage device". The read-only memory device that was loaded with encrypted data still contains the original encrypted data, but the key required to decrypt it has now been erased from the modified VZ storage device, so it is only possible to decrypt the encrypted data once. For example, the cipher text or encrypted data may be sensitive mission data (for an aircraft going on mission), program code (containing instructions for a computer) or an operating system that needs to be decrypted first prior to use.

Figure 5:
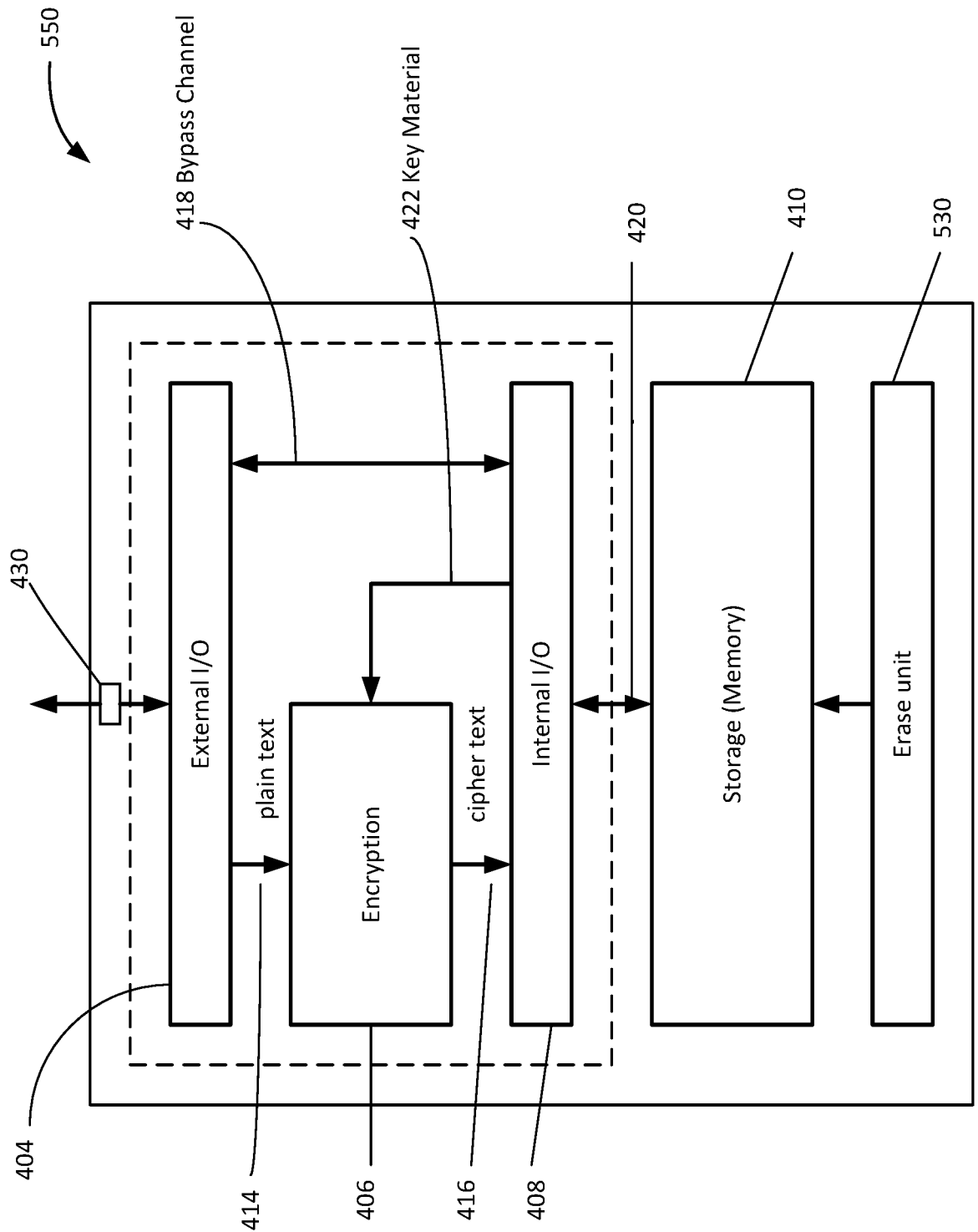
FIG. 5 is a block diagram of a VZ storage device 550 according to an embodiment of the present invention.

FIG. 5 is a block diagram of a modified VZ storage device 550 according to an embodiment of the present invention. Referring to FIG. 5, the modified VZ storage device 550 may include a VZ storage device 400 as shown in FIG. 1 and an erase unit 530 coupled to the storage device 410. The erase unit 530 is configured to erase the decrypted data (plain text) stored in the used portion of the key material, after the decrypted data has been read out from the storage device 550. In other words, the decrypted data (the plain text) can only be read out once because it will be erased by the erase unit 530 after readout. The modified VZ storage device 550 may also be referred to as a read-once VZ storage device. The modified VZ storage device 550 may include an interface port 430 configured to interface the modified VZ storage device 550 to external devices, such as one or more processing units, one or more memory devices (e.g., SRAM), and the like. In one embodiment, the storage device 410 is a flash memory device, and the erase unit 530 provides the necessary voltages to erase blocks of the flash memory device that stores the decrypted data after the decrypted data has been read out. In another embodiment, the erase unit 530 provides the necessary voltages to erase all blocks of the flash memory device. In yet another embodiment, the erase unit 530 may also verify that the storage device 410 is securely erased. The erase operation may include writing zeroes, ones, or random data to the storage device 410.

Figure 6:
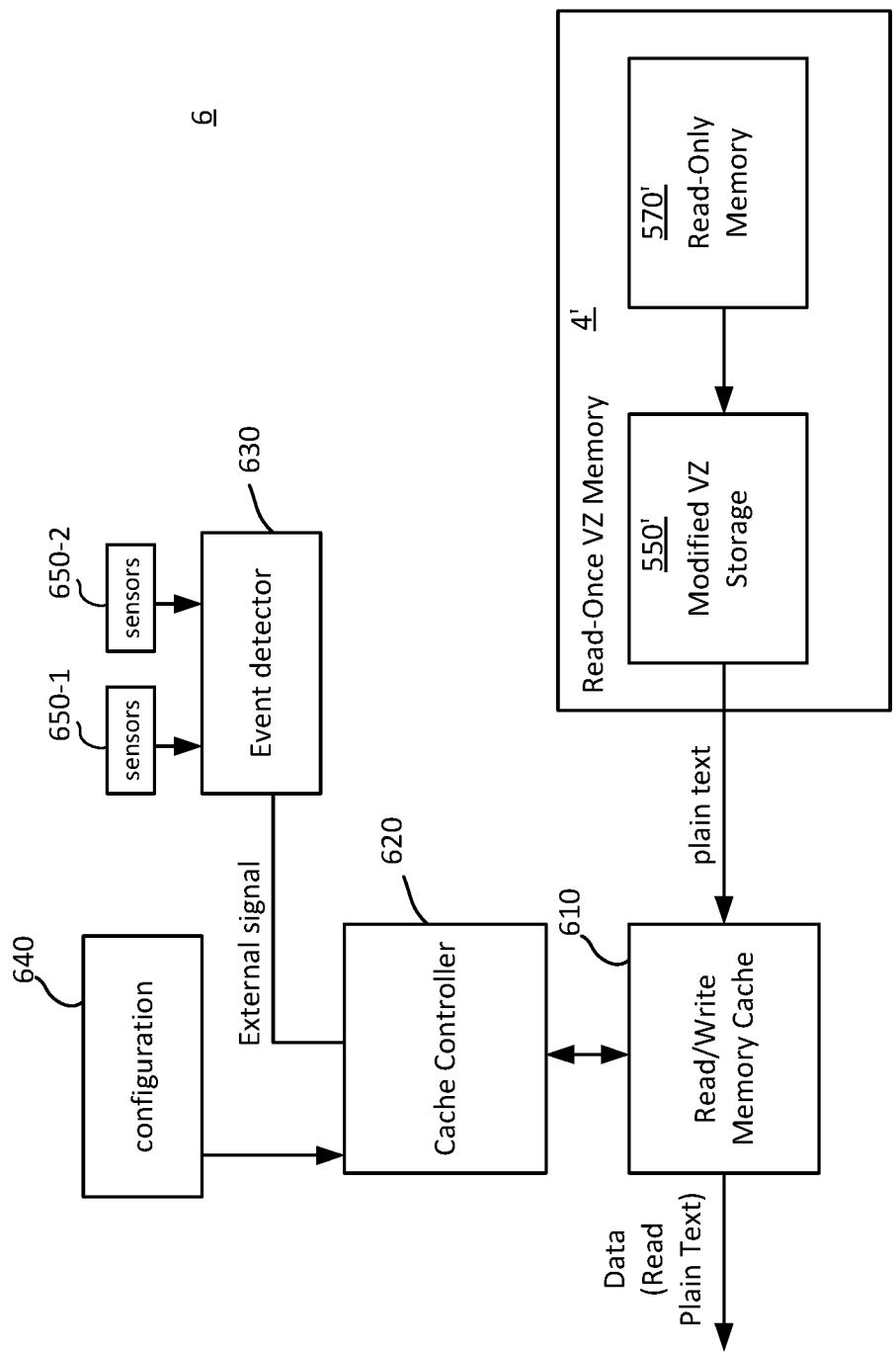
FIG. 6 is a block diagram illustrating a virtual zeroisation (VZ) system for decrypting a cipher text using a VZ storage device that can only be used once and the decrypted data can only be read-back a limited number of times according to an embodiment of the present invention.

FIG. 6 is a block diagram illustrating a virtual zeroisation (VZ) system 6 for decrypting a cipher text using a modified VZ storage device that can only be used once and the decrypted data can only be read-back a limited number of times, in accordance with one embodiment of the present invention. The VZ system 6 may include a modified VZ storage device 550' and a read-only memory device 570' that can be similar or the same as the modified VZ storage device 550 (FIG. 5) and the read-only memory device 570 shown in FIG. 4 and described above. That is, cipher text (encrypted data) stored in the read-only memory 570' was previously encrypted using the same key material as that contained in the modified VZ storage device 550'. As the encrypted data is decrypted by the modified VZ storage device 550' using the key material of the modified VZ storage device 550', the decrypted data takes the place of the consumed portion of the key material in the modified VZ storage device 550'. In one embodiment, the VZ system 6 may further include a cache device 610 and a cache controller 620. The cache device 610 may be a static random access memory (SRAM) device, a dynamic random access memory (DRAM) device, or a flash memory device. The cache device 610 is thus a readable and writeable cache memory. The plain text data (decrypted data) in the modified VZ storage 550' is written to the cache device 610 under the control of the cache controller by the erase unit 530.

In some embodiments, the VZ system 6 may further include a configuration device 640 that enables a user to enter operations or environment parameters to limit the read operation of the plain text stored in the modified VZ storage device 550'. For example, a user can enter a time-based parameter that limits the read-back operation of the plain text of the modified VZ storage device 550' to a predetermined time duration (e.g., 24 hours) or an operation-based parameter to limit the number of read-back operations, e.g., the plain text data will be erased after two read-back operations. In some other embodiments, the VZ system 6 may further include an event detection device (unit) 630 coupled to a multitude of sensors (650-1, 650-2, etc.) configured to detect, for example, a voltage change, a temperature change, a tamper attempt, an alarm signal, a device error, an IO error, and the like and generates a signal to the cache controller to cause the plain text in the cache device 610 to be erased.

In accordance with the present invention, the decrypted data is stored in the cache device 610. Time-based, operations-based and external controls can be used to permit time-limited, or operations-limited multiple reads of the decrypted data before it is securely erased. It may be possible to operate in this mode without a physical cache. As the modified VZ storage device 550' holds the plain text, if the second secure erasure is delayed, then the plain text can be read from it multiple times. However, it will be more secure to use a volatile cache to hold the plain text because the modified VZ storage device has a nonvolatile storage, and it may not be possible to erase it properly under all error or attack scenarios.

Figure 7:
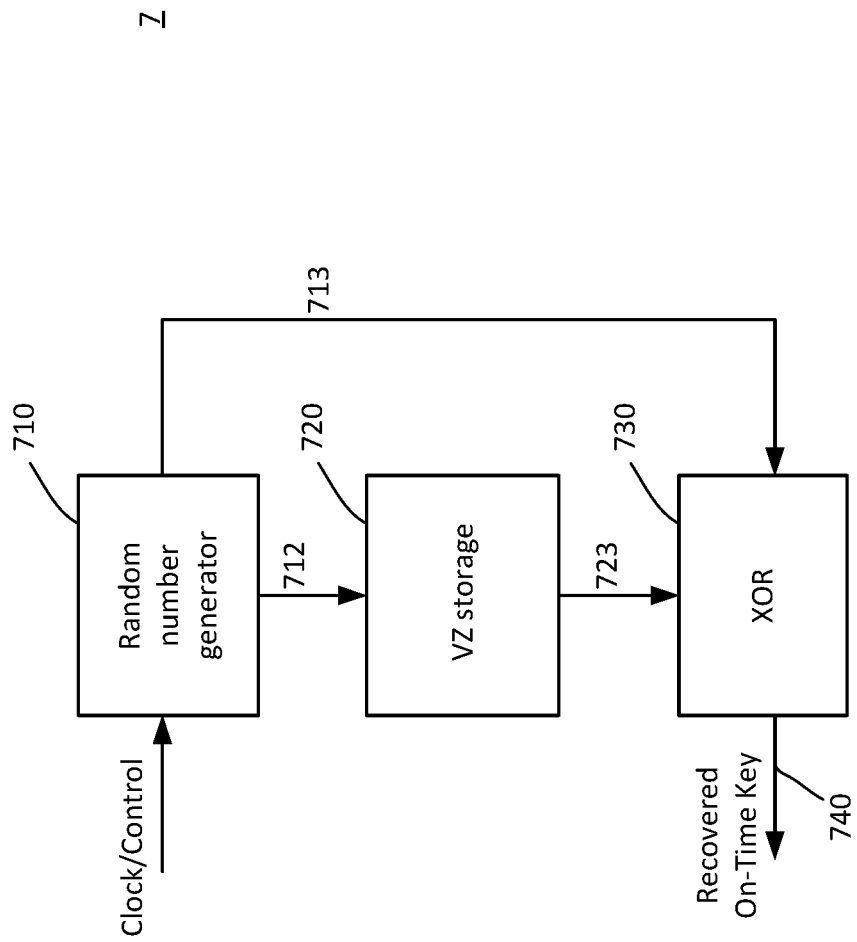
FIG. 7 is a block diagram illustrating a one-time key recovery system according to an embodiment of the present invention.

FIG. 7 is a block diagram illustrating a one-time key recovery system 7 according to one embodiment of the present invention. The one-time key recovery system 7, as shown, may include a random number generator (RNG) 710, a VZ storage device 720, and a XOR logic circuit 730. The RNG 710 generates random sequences of signals that can be, for example, binary signals representing by logic "0" and "1", or analog signals representing by a positive voltage and a negative voltage. In one exemplary embodiment, the RNG 710 is a true random number generator that generates true random sequences of binary signals 712 and provides the true random sequences of binary signals to the VZ storage device 720 to encrypt the true random sequence 712 with the one-time pad key stored in the VZ storage device 720. The VZ storage device 720 may be the VZ storage device 400 shown in FIG. 1 and described above. In one embodiment, referring to FIG. 1, the RNG 710 provides a copy of the true random sequence of binary signals 712 to the VZ storage device 400 through the external 110 port 404 and encrypts the random sequence of binary signals 712 with the one-time pad key stored in storage 410. That is, the random sequence of binary signals 712 randomizes the one-time pad key. In order words, the VZ storage device 720 will output a double-encrypted data stream 723. The XOR logic circuit 730 performs an exclusive-or (XOR) operation on the data stream 723 of the VZ storage device 720 and a data stream 713 of the RNG 710 which is the exact copy of the true random sequences of binary signals 712 that is encrypted with the one-time pad key and stored in the VZ storage device 720. The result of the XOR operation produces the original one-time pad key 740 at the output of the XOR logic circuit 730.

In one embodiment, the one-time key recovery system 7 enables a secure transport of the one-time pad key by scrambling the one-time pad key in the storage 410 of the VZ storage device 400 with a true random binary sequence of binary signals. The one-time pad key can be securely recovered by performing an XOR-operation of the scrambled one-time pad key with the exact copy of the true random binary sequence of binary signals.

According to the present invention, the one-time pad key recovery supports read-once, and read-multiple operations by the addition of the RNG 710 in the VZ storage device. By writing the true random sequence 712 of the RNG 710 to the VZ storage device 720, reading back the encrypted RNG stream 723, then XOR-ing this encrypted stream with a copy of the RNG stream 713 (same as the true random sequence 712), the one-time key material can be recovered from the VZ storage device 720, while at the same time the key material is securely erased from the VZ storage device 720. The recovered one-time key may then be saved in a battery-backed SRAM or a flash memory (not shown) that may be integrated within the one-time key recovery system 7. In the case where the one-time key recovery system 7 supports read-multiple operations, it functions as the key management 200 as shown in FIG. 1. That is, the recovery key of the system 7 can be provided to the virtual zeroisation storage device 400 and to the data consumer 300, as shown in FIG. 1. In the case where the one-time key recovery system 7 supports read-once operations, it functions as a read-once VZ system 6 described in reference to FIG. 6. That is, the recovered one-time key stored in the flash memory or battery-backed SRAM will be erased after it has been read out. The erasure can be performed by disconnecting or powering off the battery supply when an SRAM is used, or performing an erase operation when a flash device is used.

In one embodiment, the RNG 710 may be an external module or unit of the one-time key recovery system 6. In another embodiment, the RNG 710 and the XOR logic circuit 730 may be integrated within the VZ storage device 720 as an integrated device.

In one embodiment, the recovered one-time pad key will be used as the one-time key material for the virtual zeroisation (VZ) device 400 as shown in FIG. 2A. The thus loaded VZ storage device 400 can be used to encrypt data collected by the data source 100, as shown in FIG. 2B.

In one embodiment, the encrypted data of the VZ storage device 400 is provided to the data consumer 300 that can decrypts it using the recovered one-time pad key 740, as shown in FIGS. 2C and 2D.

Figure 8A:
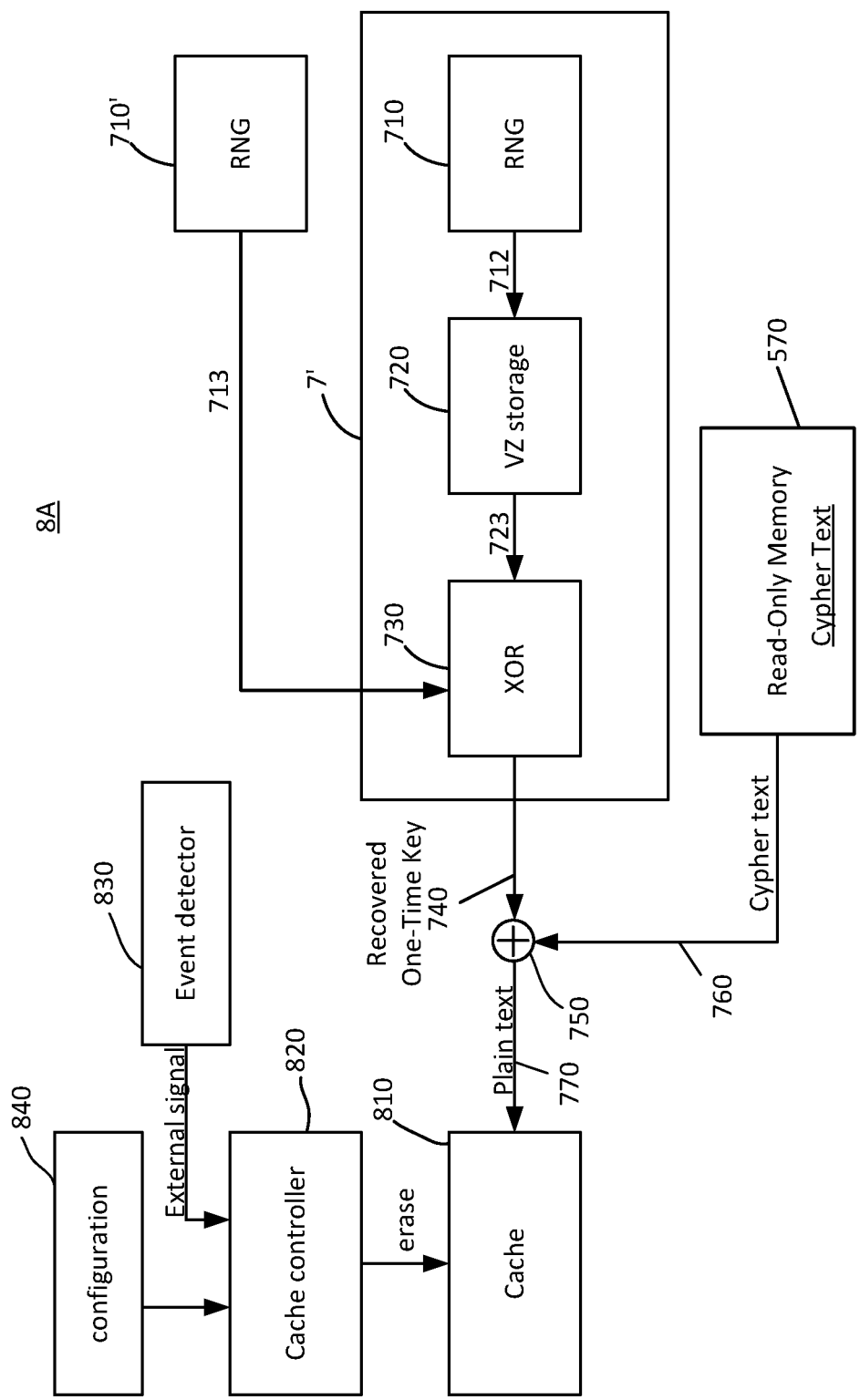
FIG. 8A is a block diagram illustrating a VZ system that may store decrypted data for a limited use according to one embodiment of the present invention.

FIG. 8A is a block diagram illustrating a VZ system 8A that may store decrypted data for a limited use according to one embodiment of the present invention. Referring to FIG. 8A, the VZ system 8A may include a one-time pad key recovery system 7' that is similar to the one-time pad key recovery system 7 shown in FIG. 7. The VZ system 8A may also include a RNG 710' that is the same as the RNG 710, i.e., the RNG 710' provides a copy of a true random binary sequence of binary signals 713 that is the same as the true random binary sequence of binary signals 712. The output XOR 730 provides the recovered one-time key 740. The VZ system 8A may further include an XOR operator 750 that receives the recovered one-time key 740 and the cipher text 760 provided by the read-only memory device 570 and outputs a plain text 770. Additionally, the VZ system 8A may include a random access memory cache device 810 and a cache controller 820. The random access memory cache device 810 is configured to store the plain text 770 under the control of the cache controller 820. The cache controller 820 performs synchronization of the cache device 810 and the one-time key recovery system 7' and controls the cache device 810 to store the recovered plain text 770 based on parameters that are user-configurable or event triggered. The cache device is a volatile memory device, e.g., a static random access memory device or a dynamic random access memory device, which will lose its content when the power supply is turned off.

In one embodiment, the VZ system 8A may further include an event detector 830 and a configuration device 840 that enables a user to enter parameters to limit the read out of the plain text stored in the cache device 810. In one embodiment, the read out operation of the cache device 810 may be time based, e.g., the one-time pad key stored in the cache device will be erased after a predetermined period of time (e.g., 24 hours). In one embodiment, the read out operation of the cache device 810 may be operations-based, e.g., the plain text stored in the cache device 810 may be erased after a predetermined number of read operations, e.g., the one-time pad key is erased after five read operations. In one embodiment, the cache controller 820 provides an erase signal to the cache device 810 to cause the erasure of the content of the cache device when a voltage change, a temperature change, a tamper attempt, or a device error (e.g., an error in the VZ storage 410, an error in the RNG 710, an error in the cache controller, an error in the configuration device, etc.) is detected. In one embodiment, the user may cause the erasure of the cache device 810 by pressing an erase button coupled to the event detector 830 or through the configuration device.

Figure 8B:
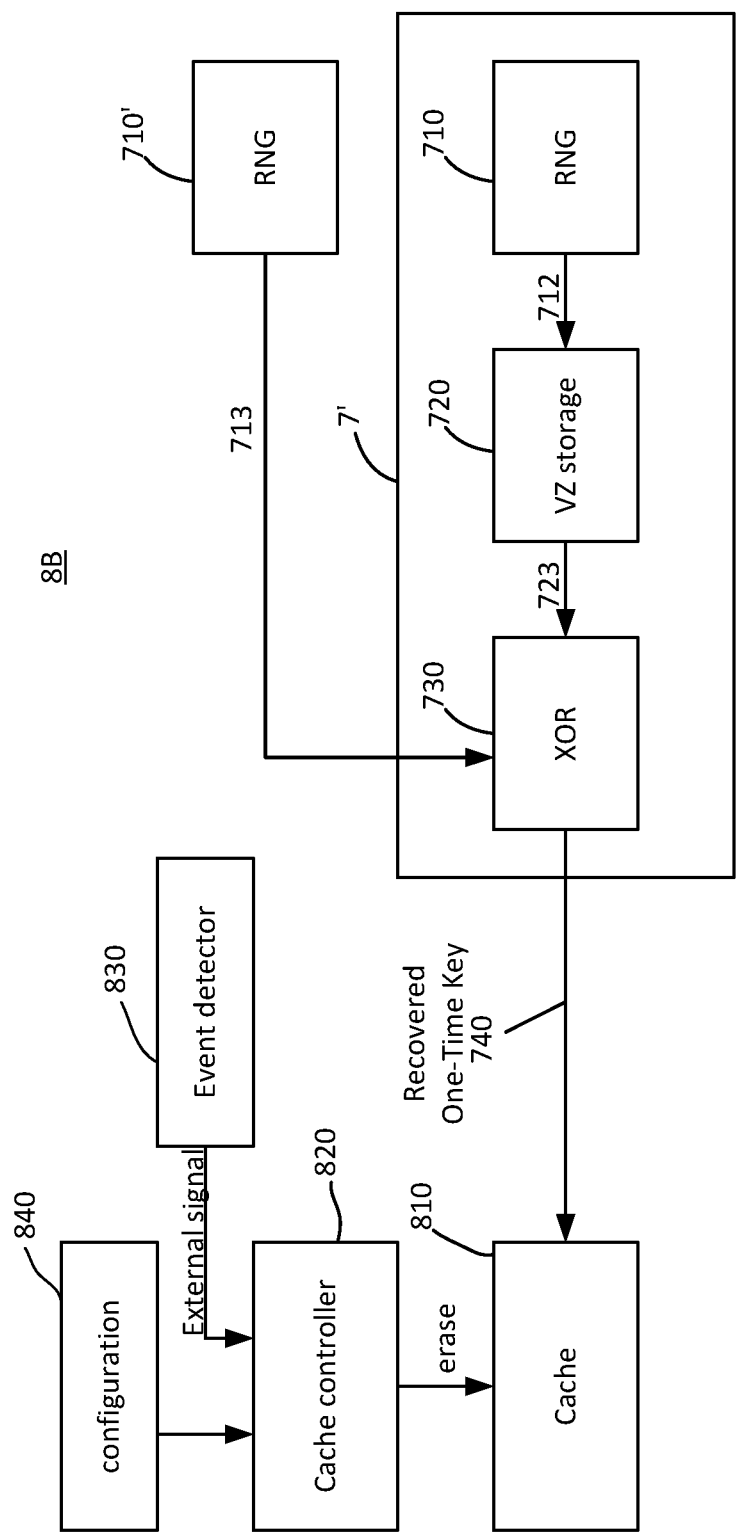
FIG. 8B is a block diagram illustrating a VZ system that enables a limited use of a recovered one-time pad key according to an embodiment of the present invention.

FIG. 8B is a block diagram illustrating a VZ system 8B that enables a limited use of a recovered one-time pad key according to one embodiment of the present invention. Referring to FIG. 8B, the VZ system 8B may include a one-time pad key recovery system 7' that is similar to the one-time pad key recovery system 7 shown in FIG. 7. The VZ system 8B may also include a RNG 710' that is the same as the RNG 710, i.e., the RNG 710' provides a copy of a true random binary sequence of binary signals 713 that is the same as the true random binary sequence of binary signals 712. In one embodiment, the RNG 710 and the RNG 710' may be the same device, i.e., the RNG 710 may be first used to encrypt the key material in the VZ storage 720, thereafter the RNG 710 is removed and sent to the data consumer 300 to recover the one-time key 740. The output XOR 730 provides the recovered one-time key 740. Additionally, the VZ system 8B may include a random access memory cache device 810 and a cache controller 820. The random access memory cache device 810 is configured to store the plain text 770 under the control of the cache controller 820. The cache controller 820 performs synchronization of the cache device 810 and the one-time key recovery system 7' and controls the cache device 810 to store the recovered one-time key 740 based on parameters that are user-configurable or event triggered.

In one embodiment, the VZ system 8B may further include an event detector 830 and a configuration device 840 that enables a user to enter parameters to limit the read out of the plain text stored in the cache device 810. In one embodiment, the read out operation of the cache device 810 may be time based, e.g., the one-time pad key stored in the cache device will be erased after a predetermined period of time (e.g., 24 hours). In one embodiment, the read out operation of the cache device 810 may be operations-based, e.g., the plain text stored in the cache device 810 may be erased after a predetermined number of read operations, e.g., the one-time pad key is erased after five read operations. In one embodiment, the cache device 810 will erase its content when a voltage change, a temperature change, a tamper attempt, or a device error (e.g., an error in the VZ storage 410, an error in the RNG 710, an error in the cache controller, an error in the configuration device, etc.) is detected. In one embodiment, the user may cause the erasure of the cache device 810 by pressing an erase button (e.g., an electronic switch or a mechanical switch) to activate the cache controller 820 to generate an erase signal to the cache device 810.

Referring to FIG. 8B, the VZ system 8B may be used to store the recovered one-time key 740 directly to the cache device 810 that enables a limited use of the recovered one-time key based on user configured parameters.

In one embodiment, the read out operation of the cache device 810 may be operations-based, e.g., the one-time pad key stored in the cache device will be erased after a predetermined number of read operations, e.g., the one-time pad key is erased after five read operations. In one embodiment, the cache device 810 may contain the plain text 770 when the cipher text is decrypted using the recovered one-time key 740. In another embodiment, the cache device 810 may contain the recovered one-time key 740 when the XOR operator 750 is bypassed. In both cases, the cache device 810 may erase its content when a voltage change, a temperature change, a tamper attempt, or a device error (e.g., an error in the VZ storage 410, an error in the RNG 710, an error in the cache controller, an error in the configuration device, etc.) is detected. In one embodiment, the VZ system 8 may include a multitude of sensors (e.g., sensors 670-1, 670-2 shown in FIG. 6) for detecting environmental changes (voltage, temperature, device errors, tamper attempts, etc.).

Figure 9:
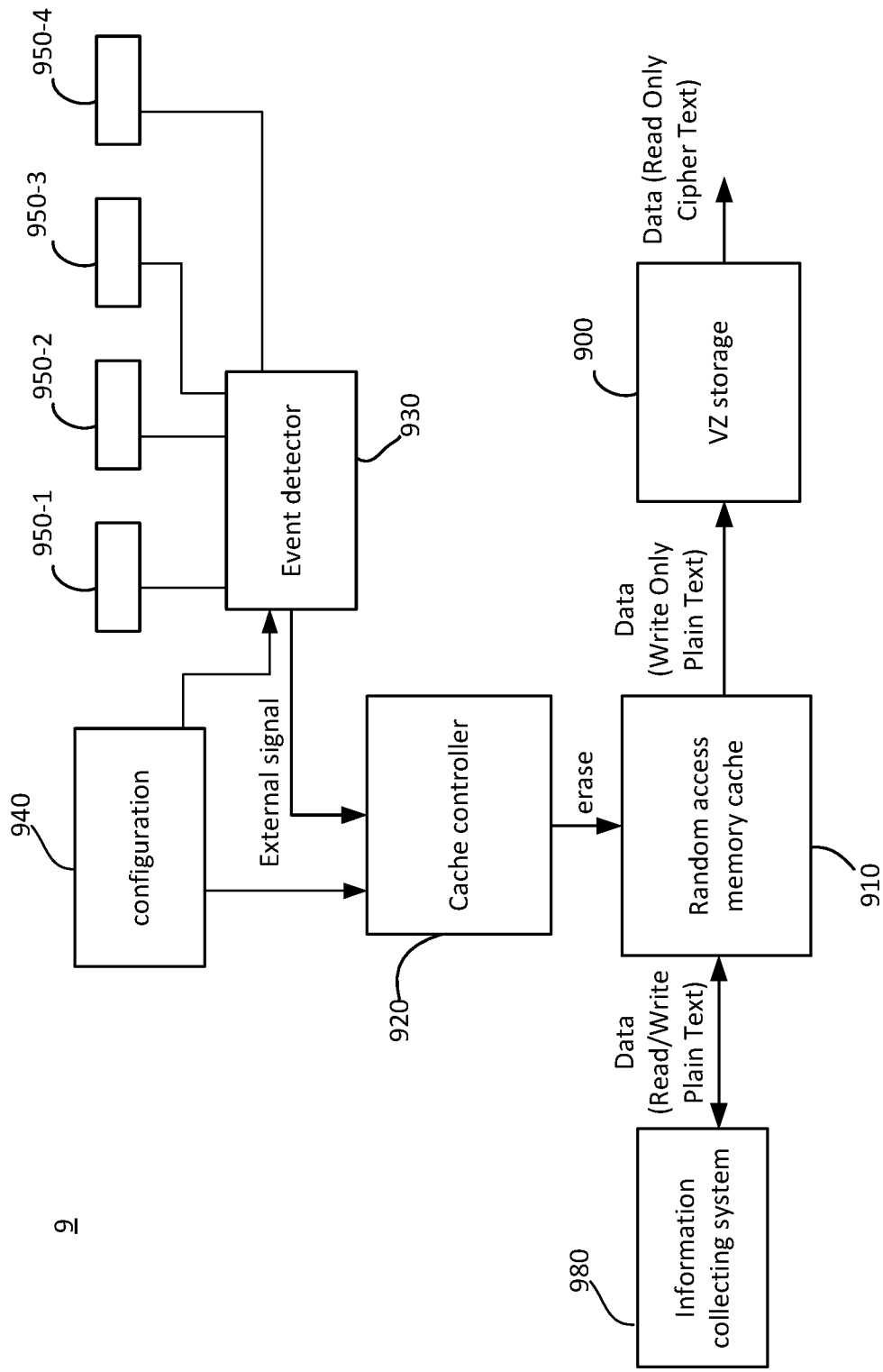
FIG. 9 is a block diagram illustrating a virtual zeroisation (VZ) system having limited read-back functionality of written data according to an embodiment of the present invention.

FIG. 9 is a block diagram illustrating a virtual zeroisation (VZ) system 9 having limited read-back functionality of written data according to one embodiment of the present invention. Referring to FIG. 9, the VZ system 9 may include a VZ storage device 900, a cache device 910, a cache controller 920, an event detector device 930, and a configuration device 940. The VZ storage device 900 may be similar or the same as the VZ storage device 400 shown in FIG. 1 and described above. The cache device 910 may be a static random access memory (SRAM) device, dynamic random access memory (DRAM) device, or flash memory device having a memory size smaller or equal to the storage size of the VZ storage device 900. The cache device 910 is thus a readable and writeable cache that can interface with an information collecting system (e.g., the data source 100) 980 and write plain text data to the VZ storage device 900 through the external input/output function 404 (FIG. 1). In the embodiment, the cache device 910 is disposed between the data source 100 and the virtual zeroisation device 400 as shown in FIG. 2B. The cache device 910 has an interface port that can interface with an information collecting system (e.g., data source 100 in FIG. 1) to receive information from the information collecting system and output the received information to the VZ storage device 900 for encryption under the control of cache controller 920. The cache controller 920 can perform synchronization of the cache device 910 and VZ storage device 900, i.e., the cache controller 920 can control the cache device 910 to read plain text data from the information collecting system (e.g. data source 100) and write the plain text data to the VZ storage device 900.

In one embodiment, the cache device 910 is coupled to the information collecting system 980 (data source 100) to receive plain text data from the data source and output the plain text data to an information display system (not shown). In other words, data received from the data source is stored in the read/write cache device 910, which then sends the received data to the VZ storage 900 under the control of the cache controller 920. The data written to the VZ storage is protected (encrypted) as for VZ. The data in the read/write cache can be read-back multiple times under the control of the cache controller 920. The storage time in the cache device 910 is configurable. In some embodiments, the read-back limits of the cache device 910 may be time-based, e.g., the cache contents expires (is erased) after a configurable period of time. In some other embodiments, read-back limits of the cache device 910 may be operations-based, e.g., the cache contents expires (is erased) after a configurable number of read operations. The user can configure the mode of operation of the VZ system 9 through the configuration device 940. In one embodiment, the configuration device 940 may include a control panel having an input device (e.g., keyboard, mouse) and a display. In one embodiment, the display may be a touch screen display including a menu such that the user can configure the operation mode of the VZ system 9 by selecting appropriate keys or entering desired parameters. In one example, the user may select the time-based read-back limit to be 24 hours, so that the content of the cache device 910 is erased after 24 hours. In another example, the user may select the operation-based read-back to be five read operations, so that the content of the cache device 910 is erased after being read five times. In one embodiment, the configuration device 940 may have a user interface so that a user can enter event triggered parameters.

In a non-limiting exemplary embodiment, the VZ system 9 may further include a multitude of sensors coupled to the event detector 930. For example, the VZ system 9 may include a sensor 950-1 for sensing a voltage variation, a sensor 950-2 for sensing a temperature change, a sensor 950-3 for sensing a tampering attempt (e.g., detecting that a device of the VZ system is disconnected), a sensor 950-4 for sensing a device error (e.g., error in the data source, error in the VZ storage device, error in the cache device, etc.). Of course, as those of skill in the art will appreciate, other sensors may also be used.

In one embodiment, the cache controller 920 may be external to the cache device 910. In another embodiment, the cache controller 920 may be integrated with the cache device 910. In yet another embodiment, the configuration device 940, the event detector device 930, the cache controller 920, and the cache device 910 may be integrated as part of a storage device for temporarily storing plain text data.

Figure 10:
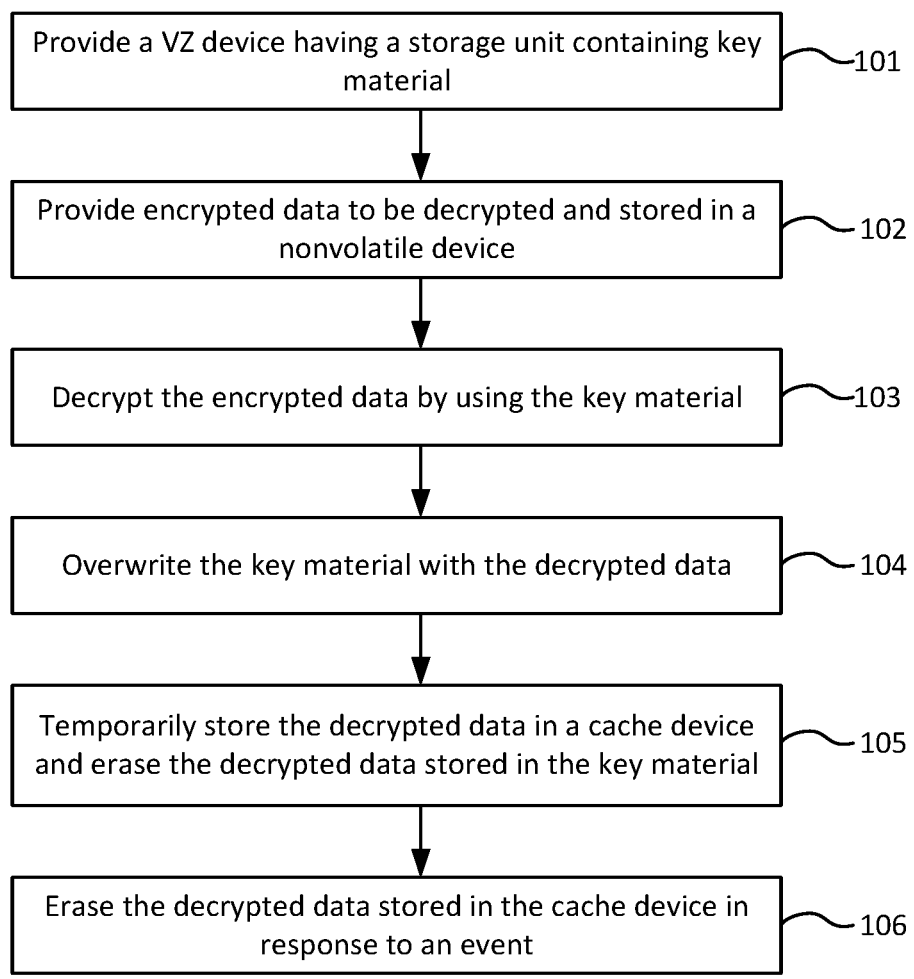
FIG. 10 is a simplified flowchart illustrating a method of decrypting encrypted data containing in a nonvolatile memory device according to one embodiment of the present invention.

FIG. 10 is a simplified flowchart illustrating a method 10 of decrypting encrypted data contained in a nonvolatile memory device according to one embodiment of the present invention. The method 10 may include, in block 101, providing a decryption device having a storage unit containing a key material. In block 102, the method may further include providing encrypted data stored in a nonvolatile memory that needs to be decrypted to the decryption device. In block 103, the method may also include decrypting the encrypted data by consuming a portion of the key material to obtain decrypted data. In block 104, the method may also include overwriting the consumed portion of the key material with the decrypted data. In block 105, the method may also include temporarily storing the decrypted data in a cache device and erasing the decrypted data stored in the consumed portion of the key material after the decrypted data has been stored in the cache device. In block 106, the method may also include erasing the decrypted data in the cache device in response to an event.

Figure 11:
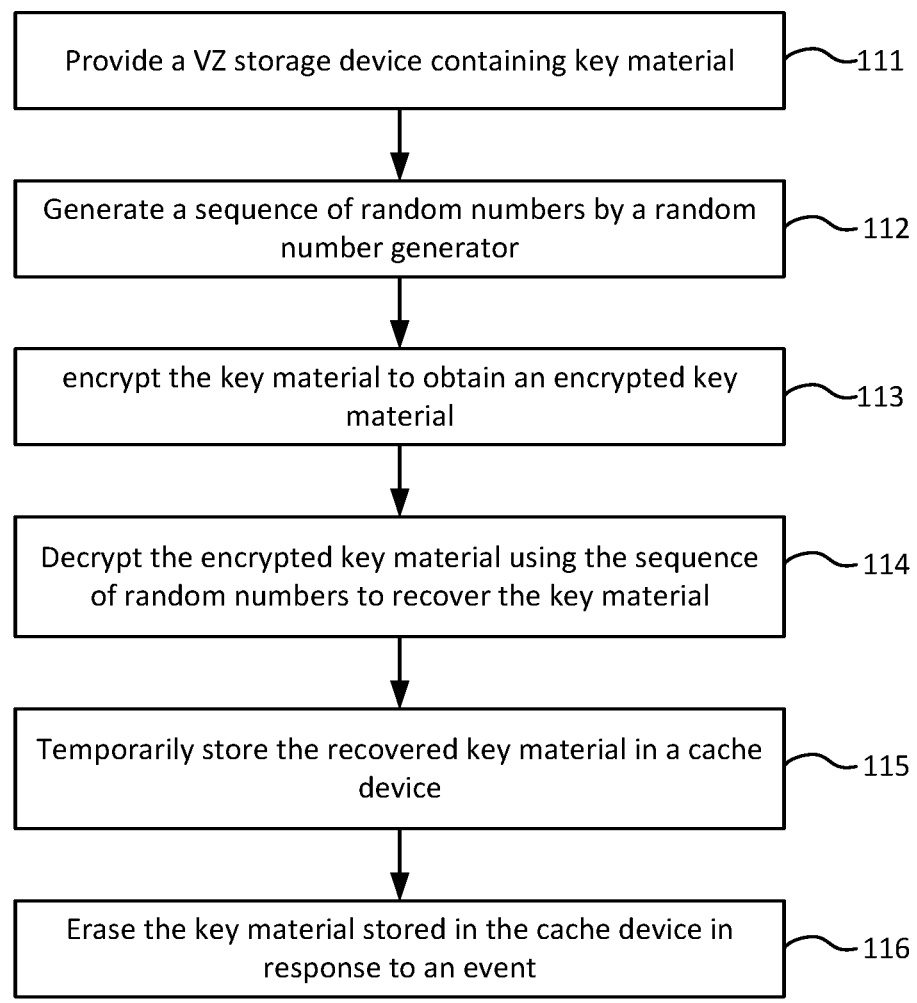
FIG. 11 is a simplified flowchart illustrating a method of transmitting and recovering an encrypted key material contained in a VZ storage device according to one embodiment of the present invention.

FIG. 11 is a simplified flowchart illustrating a method 11 of transmitting and recovering an encrypted key material containing in a VZ storage device according to one embodiment of the present invention. The method 11 may include, in block 111, providing a VZ storage device containing a key material. In block 112, the method may further include generating a sequence of random numbers by a random number generator. In block 113, the method may also include encrypting the key material using the sequence of random numbers to obtain an encrypted key material. In block 114, the method may further include decrypting the encrypted key material using an exact copy of the sequence of random signals to recover the key material. In block 115, the method may also include temporarily storing the recovered key material in a cache device. In block 116, the method may also include erasing the key material stored in the cache device in response to an event.

Figure 12:
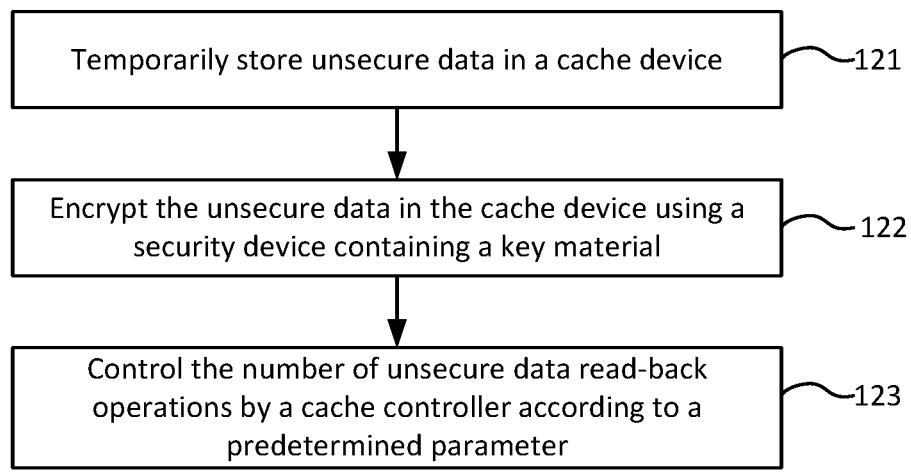
FIG. 12 is a simplified flowchart illustrating a method for securely storing data in a security system that has limited read-back functionality of stored data according to one embodiment of the present invention.

FIG. 12 is a simplified flowchart illustrating a method 12 for securely storing data in a security system that has limited read-back functionality of stored data according to one embodiment of the present invention. The method 12 may include temporarily storing unsecure data in a cache device in block 121. In block 122, the method may further include encrypting the unsecure data using a security device containing a key material. In one embodiment, the method may include encrypting the unsecure data by consuming a portion of the key material to obtain an encrypted data and overwriting the consumed portion of the key material with the encrypted data. In block 123, the method may further include reading back the unsecure data stored in the cache device using a cache controller that limits the number of data read-back operations according to a predetermined parameter. In one embodiment, the predetermined parameter is an operation-based parameter. In another embodiment, the predetermined parameter is an event-triggered parameter.

Thus, devices, systems, and methods for protecting data using a key material, recovering a key material, and limiting a number of data read-back operations have been described. Embodiments of the present invention have been described with reference to the exemplary figures that are illustrative and not limiting. One of skill in the art will appreciate that various modifications and changes may be made thereto without departing from the broader spirit and scope of the invention as set forth in the appended claims.

What is claimed is:

1. A system comprising:
   a data storage device configured to store encrypted data that has been encrypted by performing first exclusive OR (XOR) operations using a one-time pad, wherein the one-time pad is a portion of key material that is equal to a size of unencrypted data used to generate the encrypted data; and
   a virtual zeroisation (VZ) storage device coupled to the data storage device for receiving the encrypted data, wherein the VZ storage device comprises:
   a storage device a configured to store the key material for decrypting data;
   a data encryption unit coupled to the storage device and configured to use the one-time pad to decrypt the encrypted data by performing second XOR operations between the encrypted data and the one-time pad, generate plain text data, and overwrite, on the storage device, the one-time pad with the plain text data; and
   a storage device erase unit coupled to the storage device and configured to erase the plain text data stored in the storage device after the plain text data has been read-out from the storage device.

2. The system of claim 1, wherein the storage device erase unit is further configured to erase the plain text data by overwriting the storage device with zeros, ones, or random numbers generated using a random number generator on the VZ storage device.

3. The system of claim 1, further comprising:
   a cache device coupled to the VZ storage device and configured to temporarily store the plain text data read out from the VZ storage device; and
   a cache device controller coupled to the cache device and configured to control operations of the cache device.

4. The system of claim 3, wherein the cache device is a volatile memory device.

5. The system of claim 3, wherein the control operations are time-based, and the cache device is configured to erase the temporarily stored plain text data when a predetermined time duration has expired.

6. The system of claim 3, wherein the control operations are operation-based, and the cache device is configured to erase the temporarily stored plain text data when a predetermined number of read-back operations has been executed.

7. The system of claim 3, wherein the control operations are event-based, and the cache device is configured to erase the temporarily stored plain text data when a predetermined event is detected.

8. The system of claim 1, wherein the storage device erase unit is configured to verify that the storage device is securely erased.

9. The system of claim 1, wherein the data encryption unit comprises a hardware or software logic for performing encryption.

10. A system comprising:
a virtual zeroisation (VZ) storage device comprising an encryption unit and configured to store a key material;
a random number generator coupled to the VZ storage device and configured to generate a sequence of random binary signals and to provide the sequence of random binary signals to the VZ storage device, wherein the VZ storage device is configured to encrypt the key material by performing a first exclusive OR (XOR) function between the key material and the sequence of random binary signals to obtain an encrypted key material that is stored in the VZ storage device; and
a first exclusive OR (XOR) circuit coupled to the VZ storage device and the random number generator and configured to:
receive the encrypted key material from the VZ storage device;
receive the sequence of random sequences of binary signals from the random number generator; and
perform a second XOR operation between the sequence of random of binary signals and the encrypted key material to recover the key material in the VZ storage device.

11. The system of claim 10, further comprising:
a cache device coupled to the VZ storage device and configured to temporarily store the recovered key material; and
a cache device controller coupled to the cache device and configured to control operations of the cache device.

12. The system of claim 11, wherein the cache device is a volatile memory device.

13. The system of claim 11, wherein:
the control operations are time-based so that the cache device erases the temporarily stored recovered key material when a predetermined time duration has expired; or
the control operations are read-back-based so that the cache device erases the temporarily stored recovered key material when a predetermined number of read-back operations has been executed; or
the control operations are event-based so that the cache device erases the temporarily stored recovered key material when a predetermined event is detected.

14. The system of claim 10, further comprising:
a nonvolatile memory device containing encrypted data to be decrypted; and
a second XOR circuit configured to decrypt the encrypted data using the recovered key material to obtain plain text data.

15. The system of claim 14, further comprising:
a cache device coupled to the second XOR circuit and configured to temporarily store the decrypted data; and
a cache device controller coupled to the cache device and configured to control operations of the cache device.

16. A system comprising:
a cache device for temporarily storing unencrypted data to be encrypted in volatile memory;
a virtual zeroisation (VZ) storage device coupled to the cache device and configured to encrypt the unencrypted data;
a cache device controller coupled to the cache device configured to control a data flow between the cache device and the VZ storage device; and
a configuration device coupled to the cache device controller and configured to limit a number of times the temporarily unencrypted data in the cache device can be read out from the cache device,
wherein the VZ storage device comprises:
a data encryption unit coupled to the cache device and configured to encrypt data received from the cache device by performing an exclusive OR (XOR) operations using a one-time pad, wherein the one-time pad is a portion of key material that is equal to a size of the data received from the cache device: and
a storage unit coupled to the data encryption unit and containing configured to store the key material and to store the encrypted data in the consumed portion of the key material comprising the one-time pad.

17. The system of claim 16, wherein the configuration device is further configured to limit a time duration the temporarily stored unencrypted data is kept in the cache device.

18. The system of claim 17, further comprising an event detection device having one or more sensors configured to indicate a detection of an event.

19. The system of claim 18, wherein the event is one of a supply voltage variation exceeding a predetermined voltage range, a temperature change exceeding a predetermined temperature range, a tampering attempt, and an error in the cache device controller, the configuration device, and the VZ storage device.

* * * * *